United States Patent [19]
Sartor

[11] Patent Number: 4,750,828
[45] Date of Patent: Jun. 14, 1988

[54] STEM DEVICE FOR EYEGLASSES FRAMES AND THE LIKE

[75] Inventor: Rino Sartor, Montebelluna, Italy

[73] Assignee: Innocente Pivetta, Valdobbiadene, Italy

[21] Appl. No.: 781,824

[22] Filed: Sep. 30, 1985

[30] Foreign Application Priority Data

Apr. 3, 1984 [IT] Italy ............................... 82513 A/84
Jul. 5, 1985 [IT] Italy ............................... 82534 A/85

[51] Int. Cl.[4] .......................... G02C 5/20; G02C 5/14; G02C 5/22
[52] U.S. Cl. .................................. 351/115; 351/121; 351/113; 351/153
[58] Field of Search ..................... 351/153, 121, 113; 16/228; 351/115

[56] References Cited

U.S. PATENT DOCUMENTS

| 463,312 | 11/1891 | Borsch | 351/115 |
| 633,023 | 9/1899 | Miehle | 351/115 |
| 2,874,609 | 2/1959 | Ducati | 351/113 |
| 3,644,023 | 2/1972 | Villani | 351/121 X |
| 3,957,360 | 5/1976 | Villani | 351/153 X |

*Primary Examiner*—Rodney B. Bovernick
*Attorney, Agent, or Firm*—Guido Modiano; Albert Josif

[57] ABSTRACT

The stem device comprises a hollow body having an end and which can be removably associated with a tubular element. Between the body and element, members are provided to afford axial rotation with an elastic return bias acting therebetween. The stem device includes a peg located in an oblique slot for restricting the translatory and rotary movements of the end with respect to the element. The stem device is also effective to be snap-closed and elastically opened to an extra-open angle with respect to the front of a pair of eyeglasses.

29 Claims, 6 Drawing Sheets

STEM DEVICE FOR EYEGLASSES FRAMES AND THE LIKE

BACKGROUND OF THE INVENTION

This invention relates to a stem device for eyeglasses frames and the like.

Currently known are eyeglasses frames which have a stem or leg, associated with a hinge attached to a front piece which houses lenses, wherein the stem is positioned, in normal use, at a smaller angle than 90° with respect to the front piece.

Thus, the stems are made to lie close against the user's temples for holding the eyeglasses at an optimum position even in the event of jerky movements of the head.

Also known nowadays are eyeglasses frames which incorporate hinges, adapted for providing elastic overcenter spreading and snap-closing features.

A drawback of such prior frames is the disturbing, action of the pressure exerted by the legs on the user's temples for holding the eyeglasses in position.

Such prior frame types also have disadvantages that due to their complex construction they are consequently vulnerable, to jamming due to their complex operation, and to wear occuring in relatively movable and contacting parts.

SUMMARY OF THE INVENTION

It is a primary aim of this invention to obviate such drawbacks affecting prior types, by providing a stem device which enables eyeglasses to be held close in correct position on the head of a person without exerting pressure on the user's temples or causing any inconvenience.

Within the above aim, it is a further important object of the invention to provide a stem device which allows the stem or leg to be opened beyond its position of normal use, and a snap-action return movement of the same to its position of normal use.

This aim, the cited object and other objects which will become apparent hereinafter are achieved by a stem device for eyeglasses frames and the like characterized in that it comprises a hollow body having an end, and a tubular element detachably associable therewith, between said hollow body and said tubular element there being means adapted to permit axial rotation with elastic biasing return means acting between the same, said hinge further comprising means of limiting translation and axial rotation of said body with respect to said tubular element.

BRIEF DESCRIPTION OF THE DRAWINGS

Furhter features and advantages of the invention will be apparent from the following detailed description of a preferred, but not exclusive, embodiment of this hinge, with reference to the accompanying illustrative and not limitative drawings, where.

DESCRIPTION OF THE PREFERRED EMBODIMENTS

With reference to the cited drawing figures, the stem device particularly for eyeglasses frames, comprises a body 2 having a portion defining a substatially cylindrical shape with a cavity 3 at one of its ends, the other end, indicated at 4, being arcuately shaped for location rearward of the ear auricle of a user.

Externally of the body 2, and lying substantially concentrically thereto, there is provided, at the end formed with the cavity 3, a tubular element 5 which merges at one end with the peripheral edge of the body 2 and at the other with a cam or hinge 6 rigid with the front piece 7 of eyeglasses.

At the blind end of the cavity 3, there is formed a seat 8 for locking, guide, and return means 9 composed of a small peg having a concave side surface at the cavity 3, that peg having a head 10 of essentially parallelepipedal shape protruding from the seat 8 at an opening 11, having slightly greater width and length dimensions than the corresponding length and width dimensions of the head 10 of the peg 9 and being formed at the side surface of the tubular element 5.

That opening has an inclined longitudinal axis with respect to the longitudinal axis of the body 2 and the tubular element 5, the intersection of the head 10 of the peg with the edges of the opening 11 guiding, once a rotation has been imparted to the body 2, the axial displacement of the same.

The tubular element 5 is further formed internally with a step-like abutment 12 adapted to limit the axial travel of the end of the body 2 contained therein.

Inside the cavity 3 and the element 5, means 13 are accommodated with afford elastic return between the same once an axial rotation has been applied, such means comprising two balls 14 and 15 interacting respectively with the lateral surface of the peg and a cam 16 comprising the hing 6.

Between said balls 14 and 15, an elastic means intervenes which is formed of a cylindrical coil compression spring 17 which forces the ball 14 towards the matingly shaped lateral surface of the peg 10, and the other ball 15 towards the cam 16.

The hinge 1 is assembled by successively fitting into the tubular element 5 associated with the hinge 6 the ball 15, spring 17 and ball 14; thereafter, the end of the body 2 will be introduced at the end formed with the cavity 3.

After aligning the opening of the seat 8 with the opening 11, one may then introduce the peg 9 which is locked within the seat by the action of the spring 13 causing the ball 14 to engage therewith, the head 10 of the peg 9 thereby holding the body 2 and element 5 in mutual association.

A twisting effect of the end 4 of the body 2 relatively to the tubular element 5 occurs by virtue of the axial thrust of the spring 17 which acts on the ball 14 which in turn transfers the force to the peg 9, causing the same to slide along the oblique opening 11 until it comes to rest by being pushed against the end thereof which is most distant from the ball 15.

By moving said end 4 rotatively in the direction of the arrow A (FIG. 2) the head 10 of the peg slides downwardly along the oblique opening 11 and hence nearer to the ball 15, the lateral surface of the peg pushing the ball 14 towards the ball 15 and resultantly compressing the spring 17.

Figures 1, 2, 3:
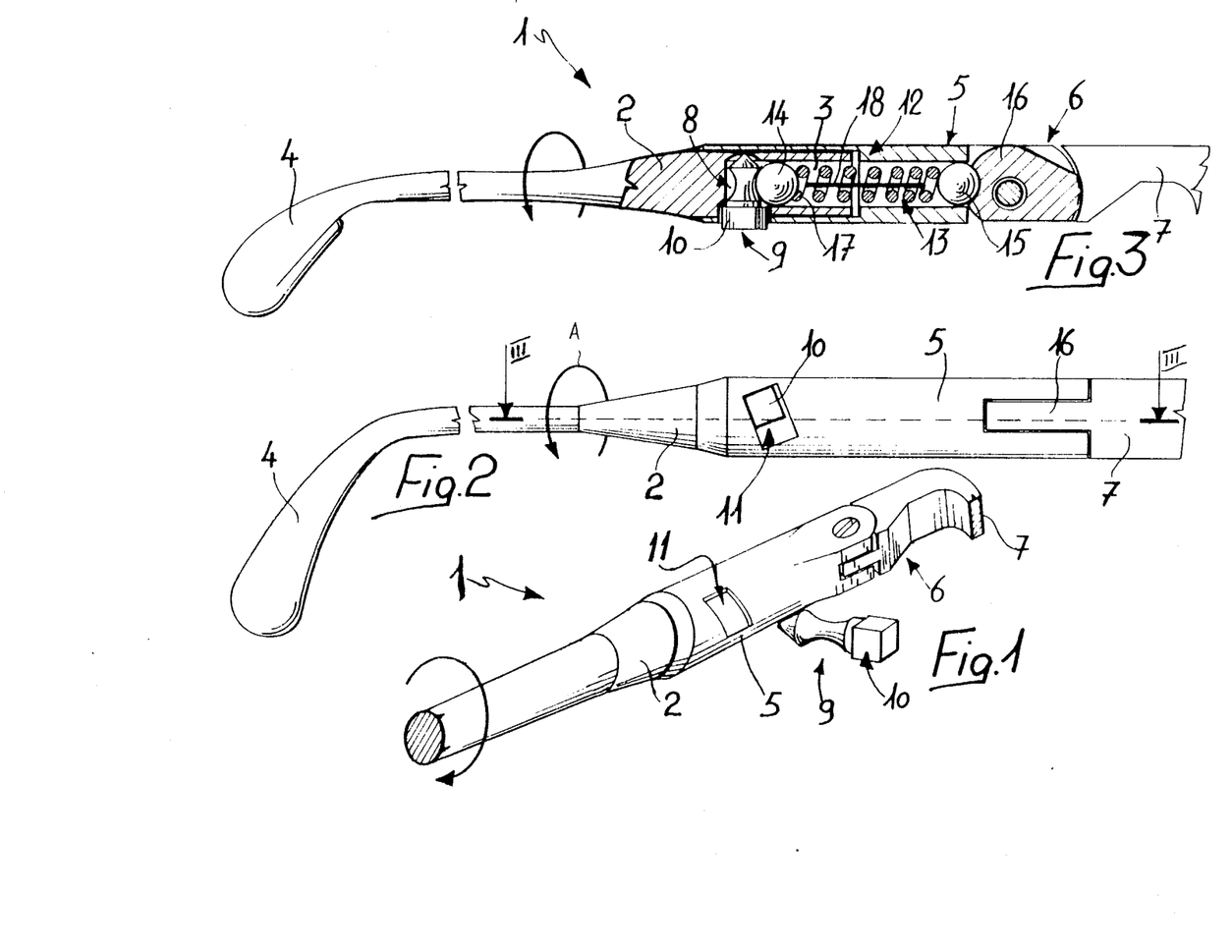
FIG. 1 is a three-quarter perspective view of the stem device according to a preferred embodiment of the invention.
FIG. 2 is a side view thereof.
FIG. 3 is a partly sectional plan view taken along the line III—III of FIG. 2.

That position being one of unstable equilibrium, on releasing the end 4 of the stem, the head 10 of the peg 9 will slide along the oblique slot and return to the position shown in FIG. 2, thereby re-positioning the end to its original position by causing it to rotate about the longitudinal axis of the stem with respect to the tubular element 5.

The spring 17 cooperating with the ball 15, also permits elastic overcenter spreading and snap-closing of the hinge 1 to be achieved, the former being limited by the presence of an abutment element 18 formed, for example, of a cylindrical pin placed inside the spring 17, the latter by the configuration of the cam 16 cooperating with the ball 15.

It has thus been shown how the invention achieves its aim and objects, it being possible to obtain an axial rotation, with elastic return with respect to the tubular element associated with the hinge 6, it being possible for the end 4 to have at rest an inclination such as to ensure close fitting of the legs or stems of eyeglasses against a person's head without causing any inconvenience thereto.

The use of the means 13 in conjunction with the cam 16 further allow a leg to be obtained which effects the elastic overcenter spreading and snap-closing with respect to the front piece 7.

A further advantage achievable by the invention resides in the fact that a stem device is provided which, while satisfying all the previously described characteristics, is of very compact size.

Of course, the invention is susceptible to many modifications and changes without departing from the scope of the same inventive concept.

Figure 4:
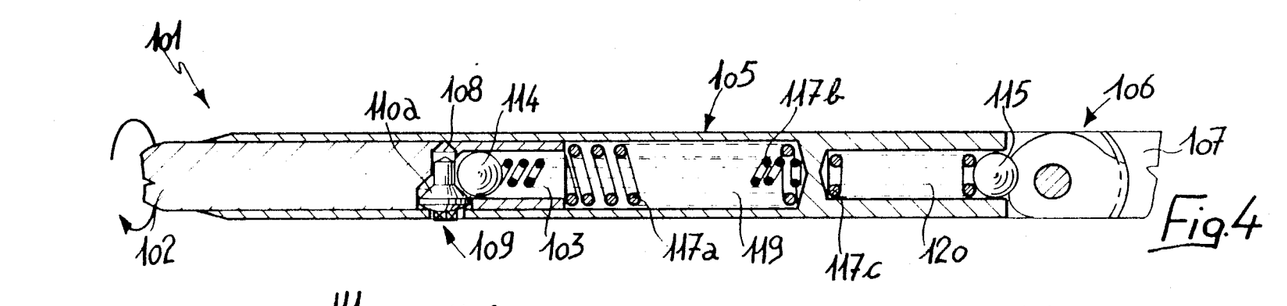
FIG. 4 is a partly sectional plan view showing another embodiment of the stem device according to the invention.
Figure 5:
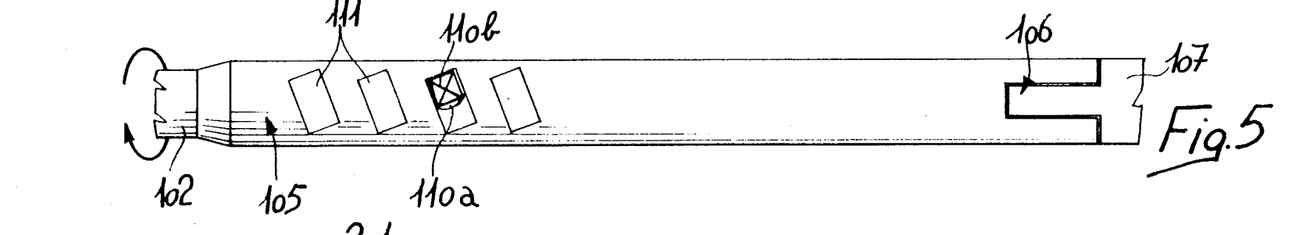
FIG. 5 is a lateral view of the stem device of FIG. 4.

Thus, as an example, in FIGS. 4 and 5, there is shown another embodiment of the hinge 101 having a body 102 of essentially cylindrical shape, formed at one end with a cavity 103, that body being inserted, in correspondence with the latter, into a tubular concentric element 105 which is slidable axially relatively to the body 102 and associated with one end with a hinge 106 rigid with the front piece 107.

At the closed end of the cavity 103, the element 102 has a seat 108 for a locking, guide and return means 109 comprising a small peg having one end 110a with a larger diameter than the width of an opening 111 formed in the lateral surface of the element 105 and inclined with respect to the longitudinal axis of the same; that peg has, protruding with respect to the end 110a, a head 110b of essentially parallelepipedal shape, and having smaller dimensions than the width and length of the openings 111.

The longitudinal extension of the peg is, moreover, shorter than the corresponding extension of the seat 108, the seat 108 allowing the whole peg to be removably accommodated therein.

The element 105 has a first cavity 119 in communication with the cavity 103 and a second cavity 120, not in communication with the first, also axial and confronting the hinge 106.

Inside the cavity 119, there is accommodated a first left-handed coil spring whose ends rest on the blind end of the cavity 119 and the perpheral edges of the end of the body 102.

Coaxially with the spring 117a there is placed inside a second right-handed coil spring 117b whose ends interact with the closed ends of the cavity 119 and the surface of a ball 114 interacting with the lateral surface of the peg.

Within the cavity 120, there is instead a spring 117c cooperating with a ball 115 in turn interacting with the cam 106.

Also in this variation, the twisting effect occurs under the thrusts of the two springs 117a and 117b, the former urging the body 102 directly, and the latter urging the ball 114 and peg.

In the element 105 there are formed, parallel to one another, several openings 111, which afford an extensible leg.

The means 109 is in fact fully insertable into the seat 108, this allowing, by virtue of the presence of the spring 117a, its head 110b to be positioned at the selected opening 111.

The shape of the end 110a will prevent the peg itself from coming out of its seat, the use of two separate springs (right- and left-handed in order that they can slide relatively to each other) enabling the user to impart a weaker force to the head 110a of the peg to change the length of the leg 101.

Acomplishment of the elastic overcenter spreading and snap-closing is similar to what has been described for the embodiment illustrated in FIGS. 1 to 3, the presence of the spring 117c allowing an independent action of the axial rotation which may be imparted to the body 102.

Figure 6:
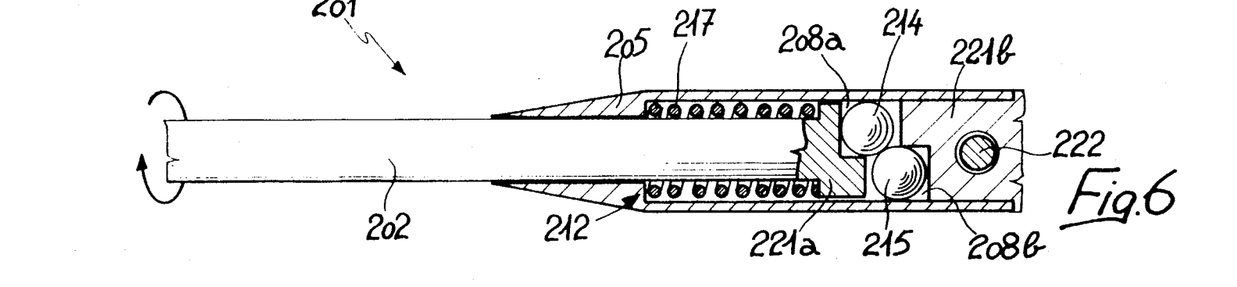
FIG. 6 is a fragmentary sectional view of a further embodiment of the stem device according to the invention.
Figure 7:
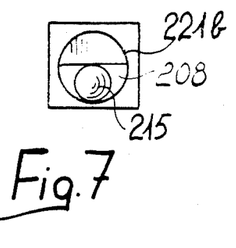
FIGS. 7 and 8 are partly sectional front and three-quarter perspective detail views respectively, of means for allowing axial rotation in the stem device of FIG. 6.
Figure 8:
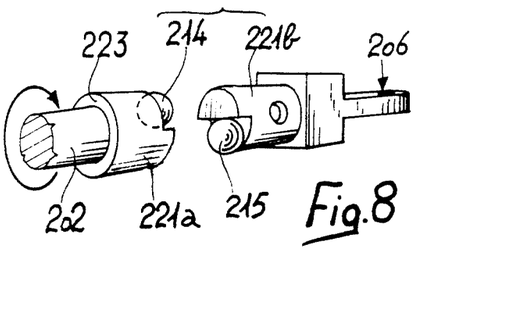

In FIGS. 6,7 and 8, there is shown a variation of a stem device 201 comprising a substantially cylindrical body 202 which has one end 221a, having the same shape but a slightly greater diameter, inserted into a tubular element 205, the latter being associated at one end, through a set screw 222, with the end 221b, identical to the end 221a, of a hinge 206.

The element 205 has inwardly, at the opposed end from that associated with the 221b, a step-like discontinuity 212, between the latter and the flat annular base 223 of the end 221a there being interposed a helical coil spring 217.

At the confronting surfaces of the ends 221a and 221b there are secured, in pre-arrange seats 208a and 208b, two balls 214 and 215.

The latter are put in contact with each other owing to the presence of the spring 217, thus by imparting a rotation to the body 202, the ball 214, which slides on the ball 215, imposes then an axial translation on the body 202, the spring 217 being compressed.

On releasing the body 202 re-positioning to the original condition will be ensured by the force applied by the spring 217 to the ball 214. Of course, the balls may be provided in any numbers, depending on requirements.

Figure 9:
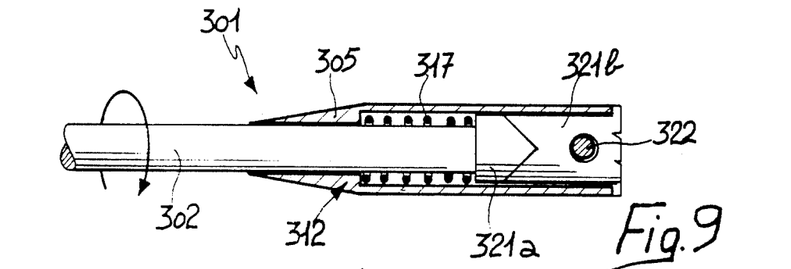
FIG. 9 is a fragmentary sectional view, showing a portion of a further embodiment of the stem device.
Figure 10:
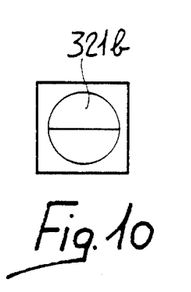
FIGS. 10 and 11 are partly sectional front and perspective detail views respectively showing rotation means of the stem device of FIG. 9.
Figure 11:
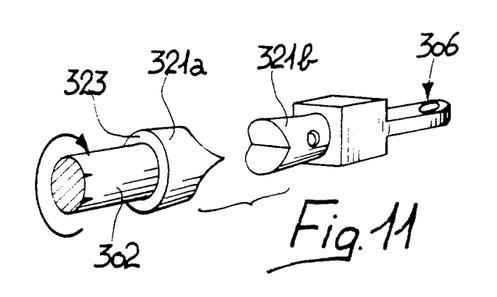

In FIGS. 9,10 and 11, there is shown another embodiment of a stem device 301, comprising an essentially cylindrical body 302 which has an end 321a, having a slightly larger diameter, placed within a tubular element 305 associable with one end, through a set screw 322, at the end 321b of a hinge 306.

Also in this case, the tubular element 305 has a step-like discontinuity 312, between the latter and the flat annular base 323 of the end 321a there intervening a helical coil spring 317.

The confronting surfaces of the ends 321a and 321b are matingly shaped to each other, the former having the shape of a male V-like wedge, the latter of a female wedge.

The particular V-like shape enables the side thrusts and hence the negative moments to be eliminated.

Figure 12:
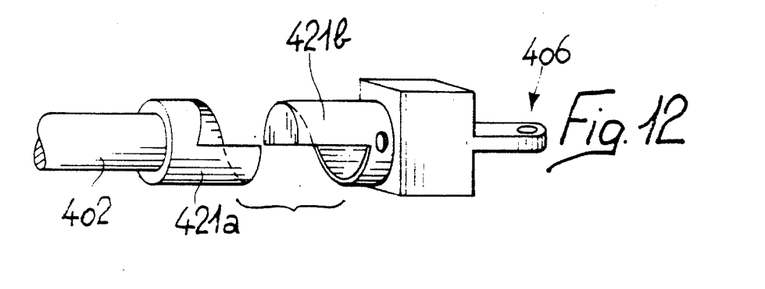
FIG. 12 is a fragmentary perspective view showing a further embodiment of the stem device.
Figure 13:
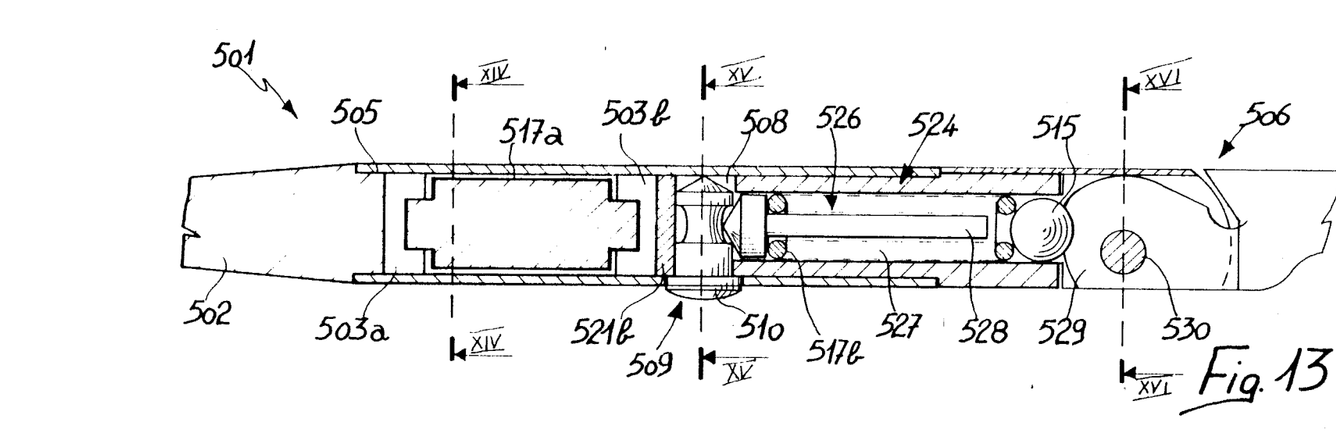
FIG. 13 is a partly sectional plan view similar to the view of FIG. 3, showing another embodiment of the stem device according to the invention.
Figure 14:
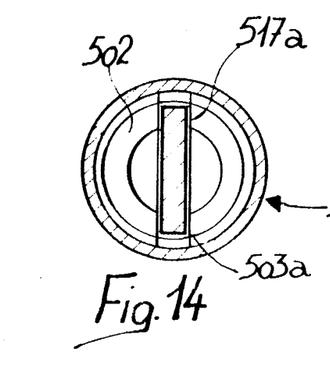
FIG. 14 is a sectional view taken along the line XIV—XIV of FIG. 13.
Figure 15:
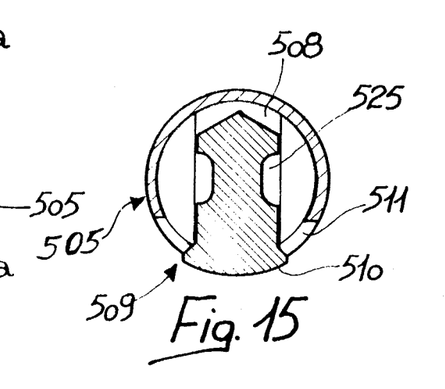
FIG. 15 is a sectional view taken along the line XV—XV of FIG. 13.
Figure 16:
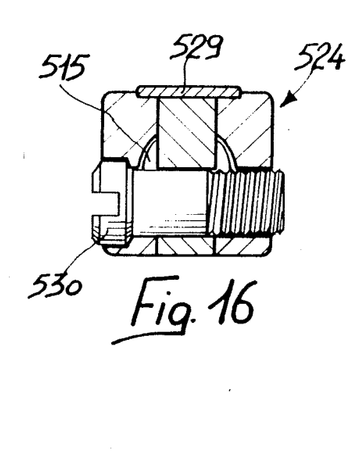
FIG. 16 is a sectional view taken along the line XVI—XVI of FIG. 13.
Figures 17, 18, 19:
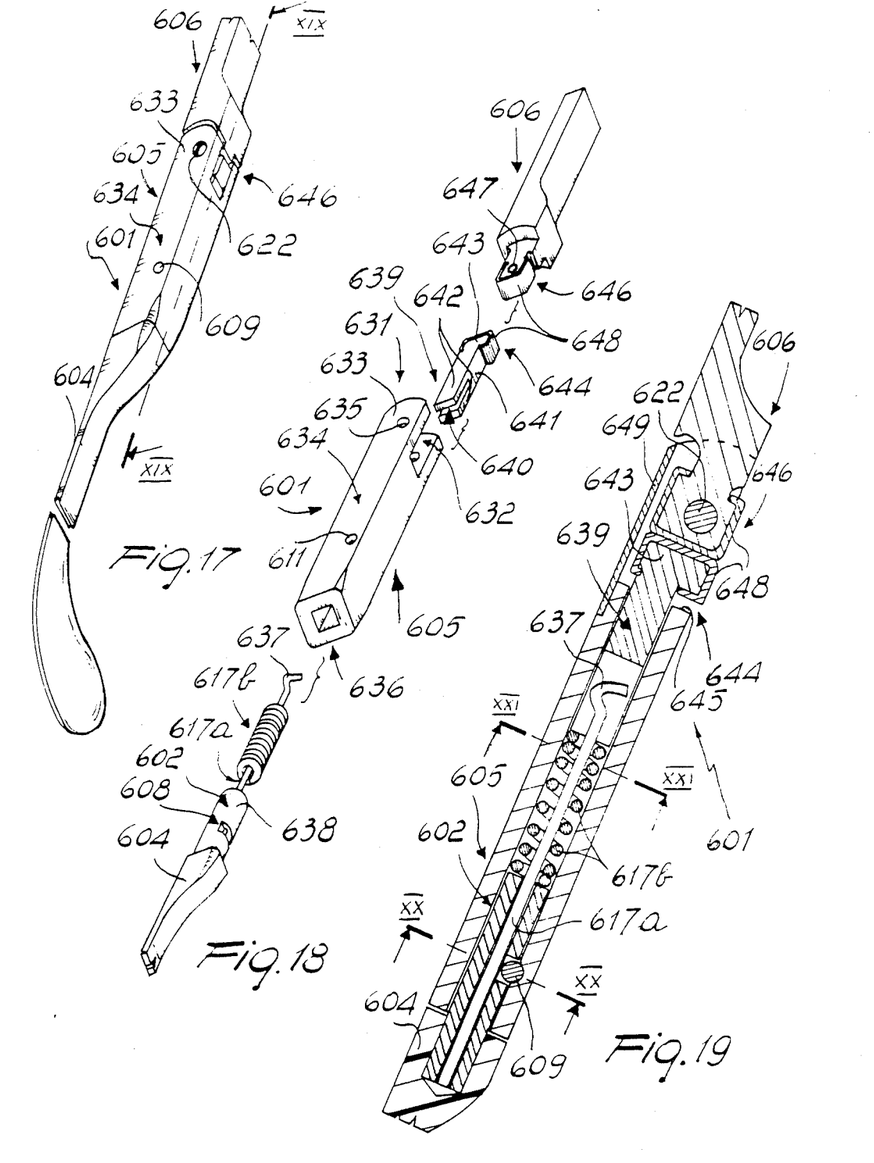
FIG. 17 is a three-quarter perspective view of yet another embodiment of the stem device according to the invention.
FIG. 18 is an exploded perspective view showing the components of the stem device of FIG. 17.
FIG. 19 is a sectional view taken along the line XIX—XIX of FIG. 17.

In FIG. 12 there is shown a further embodiment of a stem device the body 402 whereof has a terminating end 421a which interacts with a matingly shaped end 421b of a hinge 406.

The confronting surfaces of that end have an involute profile which permits of a 360-degree mutual rotation.

That profile could, of course, be a double involute design in order to allow a maximum rotation of 180°.

In FIGS. 13, 14, 15 and 16 there is shown yet another embodiment of a stem device 501 comprising a body 502 which has a cylindrical end to which a tubular element 505 is externally rigidly attached, at said end the body 502 having a diametrical cavity 503a, defining the seat for the end of a steel blade or torsion-machined coil spring 517a, its other end being inserted into a diametrical cavity 503b, identical to the diametrical cavity 503a, formed at the end 521b of the body 425 associated with the hinge 506 and formed, as visible, as a tubular member having a closed end 521b and an axial cavity 527.

Rearwardly of the cavity 503b there is formed a seat 508 for a locking, guide and return means 509 comprising a peg having a head 510 outwardly protruding from an opening 511 formed in the lateral surface of the element 505, that peg also having the function of a torsional travel limiter for the element 505 relatively to the body 524.

The peg's lateral surface has an annular groove 525, the seat for the end of a pin 526 accommodated within the longitudinal cavity 527 in communication with the seat 508, that end being held partway within the groove by the interposition between it and a ball 515, cooperating with a cam of the hinge 506, of a cylindrical helical coil spring 517b by compression.

The pin 526 has a cylindrical rod or shank 528 of such length as to permit the end-of-travel of the ball 515 cooperating with the cam 529 of the elastic hinge 506.

The position of the cam is fixed with respect to the body 524 by the interposition of a screw 530.

In this solution the means 509 provides the anchoring between the body 502 and tubular element 505 on the one side and the body 524 on the other side limiting the rotation of the structure formed by the body 502 and the element 505 relatively to the body 524.

In FIGS. 17,18,19,20,21 and 26 there is illustrated a further embodiment of a stem device 601 comprising a tubular element 605 which may expediently be of metal, having a parllelepipedal shape preferably with a substantially square or rectangular cross-section, which has in the forward area 631 a longitudinal milling 632 defining two substantially identical wings 633 slightly bevelled on the front.

On the surface 634 of the element 605, at the mid-longitudinal axis and affecting the wings 633, there is formed a through hole 635 along a perpendicular axis.

A similar hole 611 is formed, again in the surface 634 but proximate the other end 636 and slightly deviated from the mid-longitudinal axis.

The tubular element 605 defines moreover, the seat for a hollow body 602 forming a rotating pin, insertable from the end 636, having a shorter length and a slightly smaller diameter than the internal side of the element 605.

With that body 602, made hollow inside, there is rigid, on one side, a leg 604 whose end merges with the end 636 and, on the same side, with an elastic torque means 617a comprising a wire.

The latter has the same longitudinal axis as the body 602, comes out of it, and ends with a half-eye 637 the maximum bulk whereof is somewhat less than the internal side of the element 605 and the diameter whereof is much smaller than that of the body 602 itself; the length of the wire is such that the half-eye 637 does not protrude from the element 605 once the body 602 is inserted thereinto.

On the lateral surface 638 of the body 602 thereis formed a milling on a plane extending substantially perpendicular to its longitudinal axis defining a seat 608, that seat being formed at the hole 611 provided in the element 605, both of them forming a housing for a small peg 609 adapted to prevent mutual displacement between the element 605 and the body 602 and also to limit the rotation of the latter.

The tubular element 605 is also the seat for a matingly shaped slide 639 insertable from the forward area 631, that slide having a milling 640 made perpendicularly to its longitudinal axis to a depth and width suitable to accommodate the half-eye 637 without the latter interacting with the step 641 formed at the end of the same but only with the two wings 642.

The end 643 of the slide 639 is cam-shaped, with a substantially parallelepipedal shape and has a side projection 644 which interacts with the step 645 formed at the base of the milling 632.

Between the body 602 and the wings 642 of the slide 639 there is a cylindrical coil compression spring 617b, of such a diameter as to be contained in the element 605 and not to interact with the elastic means 617a.

The end 643 of the hinge 601 is coupled with a cam 646 having the same bulk and dimensions but with a hole 647 with a perpendicular axis to the longitudinal one formed in the hinge element 606 rigid with the front piece of a frame, the hinges 601 and 606 being associated by interposing a screw 622 inserted through the holes 635 and 647.

Both cams 643 and 646 are partly covered by a wear-preventing sheet 648 while, on the opposed side to that having the projection 644, there may be placed, laterally to the element 605 and at the forward area 632, an aesthetic decoration 649.

The operation will be now illustrated: the means 617a is inserted into the element 605 to position the half-eye 637 between the wings 642; this means imposing on the spring 617a a torque, since the latter, atrest, arranges itself in a perpendicular position to the one imposed by engagement with the wings 642.

Figures 20, 21, 22, 23, 24, 25, 26:
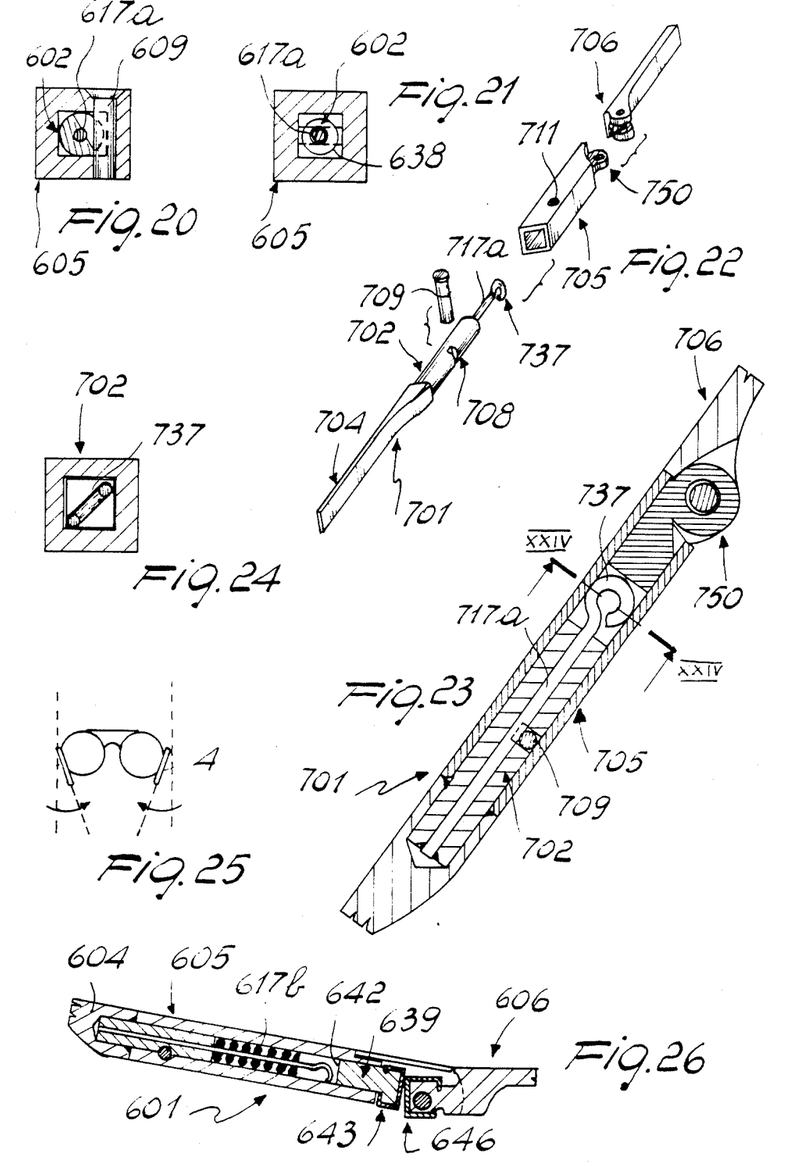
FIG. 20 is a sectional view taken along the line XX—XX of FIG. 19.
FIG. 21 is a sectional view taken along the line XXI—XXI of FIG. 19.
FIG. 22 is an exploded three-quarter perspective view of a further embodiment of the stem device according to the invention.
FIG. 23 is a longitudinal sectional view of the stem device.
FIG. 24 is a transverse sectional view taken along the line XXIV—XXIV of FIG. 23.
FIG. 25 is a schematic view illustrating the operation of the inventive stem device.
FIG. 26 is a longitudinal sectional view illustrating the operation of the embodiment shown in FIG. 17 to achieve an overcenter spreading movement.

That torque causes, as shown in FIG. 26, the leg ends placed behind the ears of the wearer of the eyeglasses, to be applied a moment which bring them to gently press onto the head, preventing incidental loss of the eyeglasses without creating inconvenience or disturbance due to pressures exerted on the temples of the wearer of the eyeglasses by the stems themselves.

The rotation of the latter is facilitated by the shape of the body 602, the peg 609 in conjunction with the seat 608 restricting the rotation, preventing any loss of the wire forming the means 617a and at the same time preventing the leg 604 from slipping out of the element 605.

The overcenter spread condition is shown in FIG. 26: on the cam 646 there rests the cam 643, thereby by acting on the stem one forces the slide 639 to translate; the latter compresses, with the bases of the wings 642, the spring 617b which tends therefore to restore the cam 643 to a condition of stable equilibrium with respect to the cam 646.

On closing, the same operation takes place while the snap-action is imparted by the shape of the cam 646 which affords a second position of stable equilibrium with the cam 643, which position is perpendicular to that of normal opening.

In FIGS. 22, 23 and 24 there is shown a further embodiment of a stem device 701 according to the invention, wherein, for simplicity, only the aspect of the twisting action imparted to the leg 704 has been considered.

In this case we still have a tubular element 705, the seat for a hollow body 702 having the function of a pivot, with which are made rigid on the one side the leg 704 and on the other an elastic torque means 717a comprising a wire ending in an eye 737 whose diameter is slightly smaller than the internal diagonal of the element 705.

In this different form, one can put, and lock, under torque the element 717a, that torque being in any case limited by the peg 709 in conjunction with the seat 708, the hinge 701 being associated through an eyed head 750 with a matingly shaped hinge 706 rigid with the front piece of a frame.

Of course, all the details may be replaced with other technically equivalent elements, and the materials may be any selected ones to meet individual requirements.

What is claimed is:

1. A stem device for eyeglasses comprising:
   an axially rotatable stem body having at least one stem body end portion,
   an elongated connection element having first and second connection element end portions,
   said stem body end portion being axially rotatively connected to said first connection element end portion, said second connection element end portion having hinge means for connection to an eyeglass front portion,
   elastic return torsional bias applying means interposed between said stem body end portion and said connection element for biasing said stem body to a rest position, axially angularly preset with respect to said connection element,
   rotation limiting means interposed between said stem body and said connection element for limiting axial rotation of said stem body with respect to said connection element.

2. A stem device according to claim 1, wherein said stem body end portion has a substantially cylindrical shape defining a stem axial cavity having a bottom surface looking toward said connection element and said first connection element end portion is substantially cylindrical, coutershaped to said stem body end portion and extending coaxially thereto, said stem axial cavity defining a seat for said elastic return torsional bias applying means and said rotation limiting means.

3. A stem device according to claim 2, wherein said first connection element end portion has a first longitudinal axis and wherein said elastic return torsional bias applying means and said rotation limiting means define a locking, guide and return means comprising a peg extending in said seat transversely to said stem axial cavity and an elastic spring means extending in said stem axial cavity and at least in said first connection element end portion for urging said peg against said bottom surface of said seat, said peg having a peg head laterally protruding from said seat at a guide opening formed in said connection element end portion, said guide opening having substantially elongated shape with larger dimensions than said peg head and defining a second longitudinal axis inclined with respect to said first longitudinal axis of said first connection element end portion.

4. A stem device according to claim 3, wherein said peg head has a substantially parallelepipedal shape and said guide opening has a substantially rectangular shape.

5. A stem device according to claim 3, wherein said peg has an intermediate enlarged portion accomodated in a matingly shaped portion of said seat and connected to said peg head, said intermediate enlarged portion of said peg having larger dimensions than said guide opening.

6. A stem device according to claim 3, wherein said peg includes a lateral surface matingly shaped to a peg locking ball accomodated in said stem axial cavity, said elastic spring means having a first spring end resting on said peg locking ball and a second spring end resting on a hinge ball cooperating with a cam element for hinge connection of said stem device with a eyeglass front portion.

7. A stem device according to claim 6, wherein said spring means is a helical spring internally and axially accomodating an abutment rod element having a shorter length than said helical spring in a rest position thereof.

8. A stem device according to claim 1, wherein said stem body end portion has a substantially cylindrical shape defining a stem axial cavity and said connection element comprises a first connection element axial cavity and a second connection element axial cavity, said first connection element axial cavity extending through said first connection element end portion and accomodating said stem body end portion, said first connection element axial cavity and said stem axial cavity defining a seat for said elastic return torsional bias applying means and said rotation limiting means, said second connection element axial cavity extending through said second connection element end portion and accomodating a pressure spring acting on a cam element of the eyeglass front portion.

9. A stem device according to claim 8, wherein said first connection element end portion has a first longitudinal axis and wherein said elastic return torsional bias applying means and said rotation limiting means define a locking, guide and return means comprising a peg extending in said seat transversely to said stem axial cavity, an elastic spring means extending in said stem axial cavity and said first connection element axial cavity and a peg locking ball arranged in said seat between said peg and said elastic spring means and being urged by said elastic spring means against said peg, said peg having a peg head laterally protruding from said seat at a guide opening formed in said connection element end portion, said guide opening having a substantially elongated shape with larger dimensions than said peg head and defining a second longitudinal axis inclined with respect to said first longitudinal axis of said first connection element end portion.

10. A stem device according to claim 9, further comprising an elastic spring extending in said first connection element axial cavity between said stem body end portion and a bottom portion of said first connection element axial cavity, said elastic spring surrounding said elastic spring means.

11. A stem device according to claim 1, wherein said stem body end portion has a substantially cylindrical shape and said connection element has a substantially tubular shape, defining a connection element axial cavity having a bottom surface, being open toward said stem body and coaxially accomodating said stem body end portion, said connection element axial cavity defining a seat for said elastic return torsional bias applying means and said rotation limiting means.

12. A stem device according to claim 11, wherein said stem end portion has an enlarged head portion and said connection element defines a rest projection extending internally to said connection element axial cavity and facing said stem end portion at a distance from said enlarged head portion, and wherein said elastic return torsional bias applying means and said rotation limiting means comprises a helical spring wound around said stem body end portion and extending between said enlarged head portion and said rest projection, said enlarged heat portion having an active surface facing said bottom surface, said active surface of said enlarged head portion and said bottom surface of said connection element axial cavity having mutually cooperating translation means for moving said enlarged head portion longitudinally away from said bottom surface and axially compressing said helical spring upon rotation of said stem body end portion with respect to said connection element.

13. A stem device according to claim 12, wherein said mutually cooperating translation means comprises diametrally opposite seat formations on said bottom surface and said active surface, each of said seat formations partially accomodating a respective ball, said balls partially projecting from a respective one of said seat formations and being in mutual contact at least upon rotation of said stem body end portion.

14. A stem device according to claim 12, wherein said mutually cooperating translation means comprises V-shaped mating formations on said bottom surface and said active surface.

15. A stem device according to claim 12, wherein said mutually cooperating translation means comprises mating involute-shaped formations on said bottom surface and said active surface.

16. A stem device according to claim 1, wherein said stem body end portion has a substantially cylindrical shape defining a stem axial cavity having a bottom surface and said connection element has a substantially cylindrical tubular shape with a closed end and extends coaxially within said stem body end portion, said closed end defining an outer surface facing said bottom surface, said bottom surface and said outer surface defining each a seat means for securing a respective end portion of said elastic return torsional bias applying means, said connection element defining a radial recess seat for said rotation limiting means.

17. A stem device according to claim 1, wherein said stem body end portion has a substantially cylindrical shape defining a stem axial cavity having a bottom surface and said connection element is substantially cylindrical and extends coaxially within said stem body end portion, said connection element having a substantially tubular shape with a closed end, said closed end defining an outer surface facing said bottom surface, said bottom surface and said outer surface defining each a seat means for securing a respective end portion of said elastic return torsional bias applying means, said tubolar shape of said connection element defining an axial recess having a seat formation for said rotation limiting means.

18. A stem device according to claim 17, wherein said rotation limiting means comprises a peg extending in said seat formation transversely to said axial recess, said axial recess coaxially accomodating an elastic spring means extending between said peg and a hinge portion of said connection element for connecting said stem device with a eyeglass front portion, said peg having a peg head laterally protruding from said seat formation at a guide opening formed in said connection element, said guide opening having a substantially elongated shape with larger dimensions than said peg head.

19. A stem device according to claim 18, comprising a pivot pin having a cylindrical shank extending in said axial recess and being surrounded by a compression helical spring forming said elastic spring means, said pivot pin having an enlarged head urged by said compression helical spring against said peg and engaging a side groove in said peg.

20. A stem device according to claim 11, wherein said elastic return torsional bias applying means comprises an elastic torque means extending in said connection element axial cavity and having two opposite ends, said stem body end portion and said bottom surface defining, respectively, a stem body engagement portion and a connection element engagement portion for a respective one of said opposite ends of said elastic torque means, and wherein said rotation limiting means comprises a peg extending incorresponding openings in said stem body end portion and said connection element, said openings having abutment surfaces cooperating with said peg for limiting angular rotation of said stem body end portion with respect to said connection element.

21. A stem device according to claim 20, wherein said bottom surface is formed by a slider element extending in said connection element axial cavity, said slider element being countershaped to said connection element axial cavity and having rotation preventing means cooperating with said connection element, said slider element further having a middle milling forming two wings engaging one of said opposite ends of said elastic torque means, and an enlarged head defining cam means for cooperation with an eyeglass front portion.

22. A stem device according to claim 20, wherein said connection element axial cavity has a substantially quadratic cross-shape.

23. A stem device according to claim '20, further comprising a helical compression spring encircling said elastic torque means and extending between said bottom surface and said stem body end portion.

24. A stem device according to claim 20, wherein said elastic torque means comprises a wire element, said wire element having one of said opposite ends rigidly connected to said stem body engagement portion, and another of said opposite ends forming a half-eye rotatively ridigly connected with said connection element engagement portion.

25. A stem device according to claim 9, wherein said elastic return torsional bias applying means comprises an elastic torque means extending in said connection element axial cavity and having two opposite ends, said stem body end portion and said connection element axial cavity defining engagement portions for said opposite ends of said elastic torque means, and wherein said rotation limiting means comprises a peg extending in corresponding openings in said stem body end portion and said connection element, said openings having abutment surfaces cooperating with said peg for limiting angular rotation of said stem body end portion with respect to said connection element.

26. A stem device according to claim 25, wherein said connection element axial cavity has a substantially quadratic cross-shape and said elastic torque means comprises a torsionally preloaded wire element, said wire element having one of said opposite ends rigidly connected to said engagement portion of said stem body end portion, and another of said opposite ends forming a half-eye rotatively rigidly engaged in said quadratic cross-section of said connection element axial cavity.

27. A stem device for eyeglasses comprising:
a stem body having at least one stem body end portion,
an elongated connection element having first and second connection element end portions,
said first connection element end portion coaxially encircling said stem body end portion and being removably and rotatively connected thereto, said first connection element end portion defining a first longitudinal axis,
said second connection element end portion having hinge means for connection to an eyeglass front portion,
elastic return torsional bias applying means interposed between said stem body end portion and said connection element for biasing said stem body to a rest position, angularly preset with respect to said connection element,
rotation limiting means interposed between said stem body and said connection element for limiting axial rotation of said stem body with respect to said connection element,
a seat recess in said stem body having a mouth portion facing said first connection element end portion,
a locking, guide and return means comprising a peg extending in said seat recess, and a guide opening formed in said connection element end portion and facing said seat recess, said peg having a peg head laterally protruding from said mouth portion of said seat recess at said guide opening and said guide opening having a substantially elongated shape with larger dimensions than said peg head and defining a second longitudinal axis inclinded with respect to said first longitudinal axis of said first connection element end portion.

28. A stem device for eyeglasses comprising:
a stem body having at least one stem body end portion,
an elongated connection element having first and second connection element end portions,
said first connection element end portion coaxially encircling said stem body end portion and being removably and rotatively connected thereto, said first connection element end portion defining a first longitudinal axis,
said second connection element end portion having hinge means for connection to an eyeglass front portion,
elastic return torsional bias applying means interposed between said stem body end portion and said connection element for biasing said stem body to a rest position, angularly preset with respect to said connection element,
a seat recess in said stem body having a mouth portion facing said first connection element end portion,
a locking, guide and return means comprising a peg extending in said seat recess, and at least one guide opening formed in said connection element end portion and facing said seat recess,
said peg having a peg head laterally protruding from said mouth portion of said seat recess at said guide opening, said peg head further having an intermediate enlarged portion adjacent to said peg head and accomodated in a matingly shaped portion of said seat, wherein said at least one guide opening has a substantially elongated shape with larger dimensions than said peg head for limiting axial rotation of said stem body with respect to said connection element, said substantially elongated shape defining a second longitudinal axis inclined with respect to said first longitudinal axis of said first connection element end portion, and wherein said intermediate enlarged portion of said peg has larger dimensions than said at least one guide opening.

29. A stem device for eyeglasses comprising:
a stem body having at least one stem body end portion, a tubular elongated element having first and second tublar element end portions, said first tubular element end portion having an outer wall and an axial cavity coaxially encircling said stem body end portion, said first tubular element end portion defining a first longitudinal axis, said second tubular element end portion having hinge means for connection to an eyeglass front portion, a seat recess in said stem body end portion, said seat recess facing said axial cavity and having a side mouth portion, a locking, guide and return means comprising a peg extending in said seat recess, a coil spring extending along said axial cavity and urging said peg against said seat recess, a ball interposed between said peg and said coil spring, and at least one guide opening formed in said outer wall of said first tubular element and facing said seat recess, said peg having a peg head laterally protruding from said side mouth portion of said seat recess at said guide opening, said at least one guide opening having a substantially elongated shape with larger dimensions than said peg head for limiting axial rotation of said stem body with respect to said tubular element, said substantially elongated shape defining a second longitudinal axis inclined with respect to said first longitudinal axis of said first tubular element end portion, said coil spring biasing said peg head in a rest position in said guide opening, corresponding to a preset angular position of said stem body with respect to said tubular element.

* * * * *